(12) United States Patent
Lee et al.

(10) Patent No.: US 10,199,819 B2
(45) Date of Patent: *Feb. 5, 2019

(54) RESONANT CONVERTER AND DRIVING METHOD THEREOF

(71) Applicant: FAIRCHILD KOREA SEMICONDUCTOR LTD., Bucheon-si (KR)

(72) Inventors: Won-Tae Lee, Cheonan-si (KR); Ji-Hoon Jang, Incheon (KR); Hyeong Seok Baek, Gimpo (KR); Hang-Seok Choi, Yongin-si (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/730,490

(22) Filed: Oct. 11, 2017

(65) Prior Publication Data

US 2018/0034261 A1 Feb. 1, 2018

Related U.S. Application Data

(63) Continuation of application No. 14/964,998, filed on Dec. 10, 2015, now Pat. No. 9,812,855.

(51) Int. Cl.
*H02M 3/335* (2006.01)
*H02H 3/247* (2006.01)
(Continued)

(52) U.S. Cl.
CPC .............. *H02H 3/247* (2013.01); *H02M 1/00* (2013.01); *H02M 1/32* (2013.01);
(Continued)

(58) Field of Classification Search
CPC .......... H02H 3/247; H02M 1/00; H02M 1/32; H02M 3/33592; H02M 2001/0003; Y02B 70/1433; Y02B 70/1475
(Continued)

(56) References Cited

U.S. PATENT DOCUMENTS 6,130,825 A * 10/2000 Imamura ........... H02M 3/33592
363/132
6,137,698 A * 10/2000 Yukawa ............ H02M 3/33576
363/127

(Continued)

OTHER PUBLICATIONS

Fairchild Semiconductor, "FAN7688—Advanced Secondary Side LLC Resonant Converter Controller with Synchronous Rectifier Control", Nov. 2015, 31 pages, Rev. 1.3.

*Primary Examiner* — Rajnikant Patel
(74) *Attorney, Agent, or Firm* — AMPACC Law Group, PLLC

(57) ABSTRACT

A resonant converter includes a first switch on the primary side and a second switch coupled to the first switch, a synchronization rectification switch on a secondary side configured to conduct during a conduction period in response to a switching operation of the first switch, and a switch control circuit configured to determine an operating region of the resonant converter to be below resonance based on a result of a comparison between the conduction period and an on period of the first switch.

20 Claims, 7 Drawing Sheets

Related U.S. Application Data

(60) Provisional application No. 62/090,004, filed on Dec. 10, 2014.

(51) Int. Cl.
 *H02M 1/00* (2006.01)
 *H02M 1/32* (2007.01)
 *H02M 1/36* (2007.01)

(52) U.S. Cl.
 CPC .......... *H02M 3/33592* (2013.01); *H02M 1/36* (2013.01); *H02M 2001/0003* (2013.01); *Y02B 70/1433* (2013.01); *Y02B 70/1475* (2013.01); *Y02P 80/112* (2015.11)

(58) Field of Classification Search
 USPC ....... 363/16–20, 21.01–21.08, 21.12, 53, 71, 363/89
 See application file for complete search history.

(56) References Cited

U.S. PATENT DOCUMENTS

| | | | |
|---|---|---|---|
| 6,535,400 B2* | 3/2003 | Bridge | H02M 3/33592 363/21.06 |
| 6,934,166 B2 | 8/2005 | Vinciarelli | |
| 7,145,786 B2 | 12/2006 | Vinciarelli | |
| 7,773,398 B2* | 8/2010 | Kyono | H02M 3/33592 363/127 |
| 7,796,404 B2 | 9/2010 | Reddy | |
| 8,134,851 B2* | 3/2012 | Soldano | H02M 3/33592 363/127 |
| 8,619,438 B2 | 12/2013 | Wang et al. | |
| 8,638,571 B2* | 1/2014 | Tschirhart | H02M 3/3376 363/17 |
| 9,257,913 B1* | 2/2016 | McDonald | H02M 3/33569 |
| 9,379,617 B2* | 6/2016 | Nishikawa | H02M 1/081 |
| 9,537,403 B2* | 1/2017 | Zhang | H02M 3/33523 |
| 2010/0103710 A1 | 4/2010 | Reddy | |

* cited by examiner

RESONANT CONVERTER AND DRIVING METHOD THEREOF

CROSS-REFERENCE TO RELATED APPLICATIONS

This application is a continuation of U.S. application Ser. No. 14/964,998, filed on Dec. 10, 2015, which claims the benefit of U.S. Provisional Application No. 62/090,004, filed on Dec. 10, 2014. The aforementioned related applications are incorporated herein by reference in their entirety.

BACKGROUND (a) Technical Field

Exemplary embodiments relate to a resonant converter and a driving method thereof.

(b) Description of the Related Art

A resonant converter is controlled in such a way as to operate in an inductive region in a DC gain characteristic according to an operating frequency. The inductive region is divided into a frequency region below a resonant frequency (hereinafter called a "below resonance") and a frequency region above the resonant frequency (hereinafter called an "above resonance") on the basis of the resonant frequency. When the resonant converter operates in the below resonance, non-zero voltage switching may occur.

Although a line voltage supplied to the resonant converter drops out, the resonant converter needs to be able to maintain its output voltage at least during a hold-up time. If the line voltage drops out, however, the input voltage of the resonant converter is reduced and the resonant converter operates in the below resonance. There is a difficulty in regulating the output voltage at least during the hold-up time in a condition in which the input voltage is reduced.

SUMMARY

An exemplary embodiment provides a resonant converter capable of reducing a conduction loss and a method of driving the same.

A resonant converter according to an exemplary embodiment includes a first switch on the primary side and a second switch coupled to the first switch, a synchronization rectification switch on a secondary side conducted during a conduction period in response to the switching operation of the first switch, and a switch control circuit configured to determine the operating region of the resonant converter to be below resonance based on the result of a comparison between the conduction period and the on period of the first switch.

The switch control circuit generates a first clock signal based on a current detection voltage corresponding to a load current and a control voltage corresponding to an output voltage and generates on-period information about the on period of the first switch by subtracting dead time information of the first and the second switches from maximum on-period information obtained by counting a period in which the first clock signal is enabled.

The switch control circuit compares conduction period information corresponding to the conduction period with the on-period information and determines the operating region of the resonant converter to be below resonance if the state in which the conduction period information is smaller than the on-period information is maintained during a first debounce time.

The switch control circuit compares conduction period information corresponding to the conduction period of the synchronization rectification switch with the on-period information and determines the operating region of the resonant converter to not be the below resonance if the state in which the conduction period information is greater than or equal to the on-period information is maintained during a second debounce time.

The switch control circuit may include a below resonance detector configured to generate a below detection signal indicative of below resonance operation based on maximum on-period information corresponding to a period in which a first clock signal for controlling the switching operation of the first switch is enabled, dead time information of the first and the second switches, and conduction period information corresponding to the conduction period of the synchronization rectification switch.

The below resonance detector may include a digital subtractor configured to generate on-period information about the on period of the first switch by subtracting the dead time information from the maximum on-period information and a first comparison unit configured to generate first reference information based on the on-period information and compare the first reference information with the conduction period information to check whether the first reference information is smaller than the conduction period information. The below resonance detector may enable the below detection signal if output of the first comparison unit maintains a first level during a first debounce time.

The below resonance detector may further include a second comparison unit configured to generate second reference information based on the on-period information and compare the conduction period information with the second reference information to check whether the conduction period information is greater than or equal to the second reference information. The below resonance detector may disable the below detection signal if output of the second comparison unit maintains the first level during a second debounce time.

The first comparison unit may generate the first reference information based on a value obtained by multiplying the on-period information by a first ratio smaller than 1, and the second comparison unit may generate the second reference information based on a value obtained by multiplying the on-period information by a second ratio which is smaller than 1 and which is greater than the first ratio.

The below resonance detector may further include a first debounce unit configured to count a period in which the output of the first comparison unit maintains the first level and generate a first detection signal when the counted period is maintained during the first debounce time and a second debounce configured to count a period in which the output of the second comparison unit maintains the first level and generate a second detection signal when the counted period is maintained during the second debounce time. The below resonance detector may enable the below detection signal in synchronization with the first detection signal and disable the below detection signal in synchronization with the second detection signal.

The below resonance detector may include an SR latch comprising a set terminal to which the first detection signal is inputted and a reset terminal to which a signal corresponding to the second detection signal is inputted. The SR latch may enable the below detection signal in response to input to the set terminal and disable the below detection signal in response to input to the reset terminal.

The switch control circuit may increase a current limit level to maintain the output voltage of the resonant converter at least during a predetermined hold-up time when the resonant converter operates below resonance.

The switch control circuit may control the current limit level based on a feedback voltage corresponding to the output voltage.

The switch control circuit may clamp a current detection voltage corresponding to a load current to the current limit level when the current detection voltage is greater than or equal to the current limit level and may control the switching operations of the first and the second switches based on the result of a comparison between the clamped current limit level and a control voltage corresponding to the output voltage.

The switch control circuit may detect non-zero voltage switching when the resonant converter operates in the below resonance.

A method of driving a resonant converter including first and second switches on the primary side and at least one synchronization rectification switch on the secondary side includes calculating the on period of the first switch, detecting the conduction period of the synchronization rectification switch, counting a period in which the conduction period is smaller than the on period, and determining an operating region of the resonant converter to be below resonance if a result of the count reaches a first debounce time.

Calculating the on period of the first switch include generating a first clock signal based on a current detection voltage corresponding to a load current and a control voltage corresponding to an output voltage of the resonant converter, counting a period in which the first clock signal is enabled, and subtracting a dead time of the first and the second switches from the counted enable period.

Counting the period in which the conduction period is smaller than the on period includes comparing a period corresponding to a first ratio of the on period with the conduction period.

The method further includes counting a period in which the conduction period is greater than or equal to the on period and determining the operating region of the resonant converter to not be below resonance if the period in which the conduction period is greater than or equal to the on period reaches a second debounce time.

Counting the period in which the conduction period is the on period or more includes comparing a period corresponding to a second ratio of the on period with the conduction period.

The method may further include increasing a current limit level to maintain an output voltage of the resonant converter at least during a predetermined hold-up time when the resonant converter operates in the below resonance.

An exemplary embodiment provides the resonant converter capable of reducing a conduction loss and the method of driving the same.

DETAILED DESCRIPTION OF THE EMBODIMENTS

The invention is described more fully hereinafter with reference to the accompanying drawings, in which exemplary embodiments of the present disclosure are shown. As those skilled in the art would realize, the described embodiments may be modified in various different ways, all without departing from the spirit or scope of the invention. Furthermore, in order to clarify a description of the invention, a description of parts not related to the description is omitted, and the same reference numbers are used throughout the specification to refer to the same or like parts.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising," will be understood to imply the inclusion of stated elements but not the exclusion of any other elements.

Figure 1:
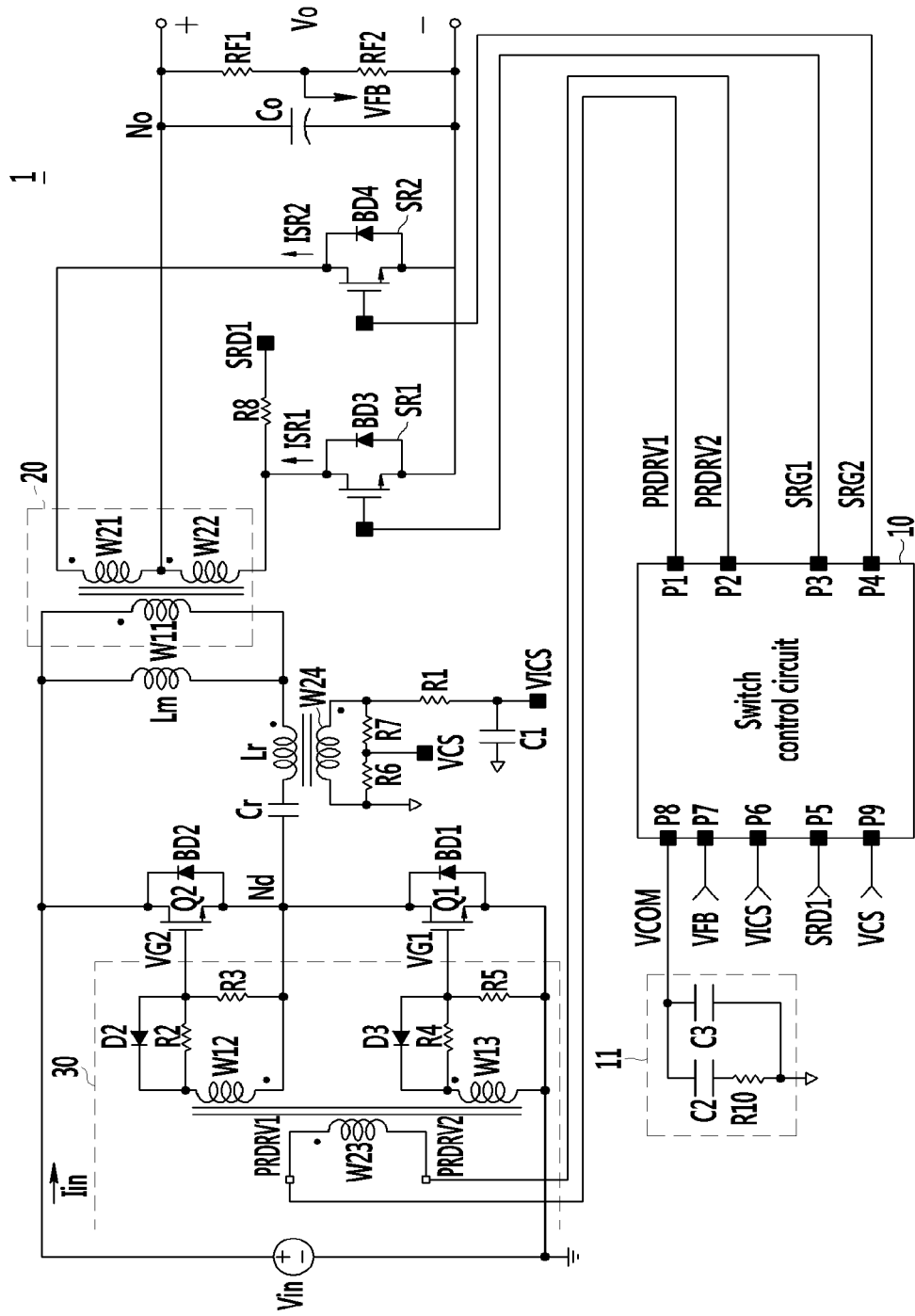
FIG. 1 is a diagram showing a resonant converter according to an exemplary embodiment.

FIG. 1 is a diagram showing a resonant converter according to an exemplary embodiment.

The resonant converter of FIG. 1 is a half-bridge LLC resonant converter. However, converters to which the invention may be applied are not limited to the half-bridge LLC resonant converter.

The resonant converter 1 includes a first switch Q1, a second switch Q2, a transformer 20, a gate driving circuit 30, a first synchronization rectification switch SR1, a second synchronization rectification switch SR2, and a switch control circuit 10.

Body diodes BD1 and BD2 are formed between the drains and sources of the first switch Q1 and second switch Q2, respectively.

The second switch Q2 and the first switch Q1 are connected in series between an input voltage Vin and a primary-side ground. The second switch Q2 and the first switch Q1 alternately switch. After a lapse of a first dead time since the second switch Q2 is turned off, the first switch Q1 is turned on. After a lapse of the first dead time since the first switch Q1 is turned off, the second switch Q2 is turned on.

The drain of the second switch Q2 is connected to the input voltage Vin, the source of the second switch Q2 and the drain of the first switch Q1 are connected at a node Nd, and the source of the first switch Q1 is connected to a ground on the primary side. The gate voltages VG2 and VG1 are supplied to gates of the second switch Q2 and the first switch Q1, respectively. The first switch Q1 and the second switch Q2 alternately perform switching, and the power supply is controlled based on the switching operation. For example, the power supply increases as the switching frequency of the first switch Q1 and the second switch Q2 decreases, and decreases as the switching frequency increases.

A capacitor Cr, a winding W1 on the primary side of the transformer 20, and an inductor Lr are connected in series between the input voltage Vin and the node Nd. Resonance occurs between the capacitor Cr, the primary winding W1, and the inductor Lr. A current "Iin" inputted to the primary side is controlled so that it becomes a sine wave by the resonance.

On the secondary side of the transformer 20, a winding W21 and a winding W22 are coupled to the primary winding W11 in an insulated manner at a predetermined winding ratio. The first synchronization rectification switch SR1 is connected to one end of the winding W22 on the secondary side, and a body diode BD3 is formed between the drain and source of the first synchronization current switch SR1. The second synchronization rectification switch SR2 is connected to one end of the winding W21 on the secondary side, and a body diode BD4 is formed between the drain and source of the second synchronization rectification switch SR2.

Hereinafter, the meaning that a current flows through the first and the second synchronization rectification switches SR1 and SR2 includes that the current flows when the first and the second synchronization rectification switches SR1 and SR2 are turned on and that the current flows through the body diodes BD3 and BD4.

The source of the first synchronization rectification switch SR1 is connected to a ground on the secondary side, and the drain of the first synchronization rectification switch SR1 is connected to the winding W22 on the secondary side, and a first gate voltage SRG1 is inputted to the gate of the first synchronization rectification switch SR1. The source of the second synchronization rectification switch SR2 is connected to the ground on the secondary side, and the drain of the second synchronization rectification switch SR2 is connected to one end of the winding W21 on the secondary side, and a second gate voltage SRG2 is inputted to the gate of the second synchronization rectification switch SR2.

The other end of the winding W21 and the other end of the winding W22 are connected to an output node No. A capacitor Co is connected between the output node No and the ground on the secondary side. The voltage of the output node No becomes an output voltage Vo.

The body diode BD3 becomes conductive by a current flowing into the winding W22 on the secondary side, and thus the first synchronization rectification switch SR1 is turned on. In response thereto, the current of the winding W22 on the secondary side is rectified by the first synchronization rectification switch SR1, thus flowing into the capacitor Co. The current flowing through the first synchronization current switch SR1 is hereinafter called a first synchronization rectification current ISR1.

The body diode BD4 becomes conductive by a current flowing into the winding W21 on the secondary side, and thus the second synchronization rectification switch SR2 is turned on. In response thereto, the current of the winding W21 on the secondary side is rectified by the second synchronization rectification switch SR2, thus flowing into the capacitor Co. The current flowing through the second synchronization current switch SR2 is hereinafter called a second synchronization rectification current ISR2.

The first and the second synchronization rectification currents ISR1 and ISR2 may be supplied to a load or may charge the capacitor Co. A ripple of the output voltage Vo is attenuated by the capacitor Co.

The gate driving circuit 30 includes a winding W23 on the secondary side, two windings W12 and W13 on the primary side, four resistors R2-R5, and two diodes D2 and D3.

A first driving voltage PRDRV1 is inputted to one end of the winding W23 on the secondary side, and a second driving voltage PRDRV2 is inputted to the other end of the winding W23 on the secondary side. The resistor R2 and the diode D2 are connected in parallel between one end of the winding W12 on the primary side and the gate of the second switch Q2. The other end of the winding W12 on the primary side is connected to one end of the resistor R3 and the node Nd. The resistor R2, the resistor R3, and the anode of the diode D2 are connected to the gate of the second switch Q2. The resistor R4 and the diode D3 are connected in parallel between one end of the winding W13 on the primary side and the gate of the first switch Q1. The other end of the winding W13 on the primary side is connected to one end of the resistor R5 and the ground on the primary side. The resistor R4, the resistor R5, and the anode of the diode D3 are connected to the gate of the first switch Q1.

The first switch Q1 performs a switching operation in response to the gate voltage VG1, and the second switch Q2 performs a switching operation in response to the gate voltage VG2. Since the first switch Q1 and the second switch Q2 are n channel transistors, an enable level of each of the gate voltage VG1 and the gate voltage VG2 is a high level, and a disable level is a low level.

When the first driving voltage PRDRV1 is a high level and the second driving voltage PRDRV2 is a low level, the current of the winding W12 on the primary side flows through the resistor R3 and the diode D2, and the current of the winding W13 on the primary side flows through the resistor R4 and the resistor R5. Accordingly, the gate voltage VG1 becomes a high-level voltage capable of turning on the first switch Q1, and thus the first switch Q1 is turned on. The gate voltage VG2 becomes a voltage lower than the source voltage of the second switch Q2, and thus the second switch Q2 is turned off.

When the second driving voltage PRDRV2 is a high level and the first driving voltage PRDRV2 is a low level, the current of the winding W12 on the primary side flows through the resistor R2 and the resistor R3, and the current of the winding W13 on the primary side flows through the resistor R5 and the diode D3. Accordingly, the gate voltage VG2 becomes a high-level voltage capable of turning on the second switch Q2, and thus the second switch Q2 is turned on. The gate voltage VG1 becomes a voltage lower than the source voltage of the first switch Q1, and thus the first switch Q1 is turned off.

When the input current "Iin" flows into the inductor Lr, a current is induced to the winding W24 on the secondary side, thereby generating a detection voltage VCS. For example, when the input current "Iin" flows toward the node Nd from the inductor Lr by a resonance, the current of the winding W24 on the secondary side flows into the ground on the secondary side through the resistor R7 and the resistor R6. In response thereto, a positive detection voltage VCS corresponding to the input current "Iin" is generated. When the input current "Iin" flows from the node Nd to the inductor Lr by a resonance, the current of the winding W24 on the secondary side flows through the resistor R6 and the resistor R7 from the ground on the secondary side. Accordingly, a negative detection voltage VCS corresponding to the input current "Iin" is generated. The detection voltage VCS is supplied to the switch control circuit 10 through a pin P9. The switch control circuit 10 may detect an overcurrent using the detection voltage VCS.

The resistor R1 is connected to one end of the winding W24 on the secondary side, and the other end of the resistor R1 is connected to one end of the capacitor C1 and a pin P6.

The other end of the capacitor C1 is connected to the ground on the secondary side. A voltage corresponding to a current flowing into the winding W24 on the secondary side is integrated by through an RC filter including a resistor R1 and the capacitor C1. The result of the integration is information corresponding to a current supplied to a load (hereinafter called a "load current"). The result of the integration is a voltage for detecting a load and is hereinafter called a current detection voltage VICS.

The switch control circuit 10 includes a pin P1 from which a first driving voltage PRDRV1 is output, a pin P2 from which a second driving voltage PRDRV2 is output, a pin P3 from which the first gate voltage SRG1 is output, a pin P4 from which the second gate voltage SRG2 is output, a pin P5 to which the first drain voltage SRD1 is inputted, the pin P6 to which the current detection voltage VICS is inputted, a pin P7 to which a feedback voltage VFB is inputted, a pin P8 to which a compensator 11 is connected, and the pin P9 to which the detection voltage VCS is inputted.

The pin P5 is connected to the drain of the first synchronization rectification switch SR1 through a resistor R8. The pin P7 is connected to a node to which the two resistors RF1 and RF2 are connected. The output voltage Vo is divided by the two resistors RF1 and RF2, thereby generating the feedback voltage VFB.

The compensator 11, including a resistor R10, a capacitor C2, and a capacitor C3, is connected to the pin P8. The capacitor C3 is connected in parallel to the resistor R10 and the capacitor C2 that are connected in series. One electrode of the capacitor C2 and one electrode of the capacitor C3 are connected to the pin P8. One end of the resistor R10 is connected to the other end of the capacitor C2, and the other end of the resistor R10 and the other electrode of the capacitor C3 are connected to the ground on the secondary side.

The switch control circuit 10 generates an error voltage by amplifying a difference between the feedback voltage VFB and a predetermined reference voltage. The error voltage is compensated for by the compensator 11, thereby generating a control voltage VCOMP. The switch control circuit 10 generates first and second clock signals CLK1 and CLK2 using the control voltage VCOMP and the current detection voltage VICS received through the pin P6 and controls the switching operations the first and the second switches Q1 and Q2, respectively, in response to the first and the second clock signals CLK1 and CLK2.

For example, the switch control circuit 10 may turn on the first switch Q1 at a point of time delayed from the rising edge of the first clock signal CLK1 by a dead time and turn off the first switch Q1 at the falling edge of the first clock signal CLK1. The switch control circuit 10 may turn on the second switch Q2 at a point of time delayed from the rising edge of the second clock signal CLK2 by a dead time and turn off the second switch Q2 at the falling edge of the second clock signal CLK2.

The switch control circuit 10 turns on the first synchronization rectification switch SR1 in synchronization with the turn-on of the first switch Q1 and turns on the second synchronization rectification switch SR2 in synchronization with the turn-on the second switch Q2. The switch control circuit 10 maintains the first and the second synchronization rectification switches SR1 and SR2 during a predetermined on period and turns off them.

For example, the switch control circuit 10 may determine the on period of each of the first and the second synchronization rectification switches SR1 and SR2 based on a conduction period in the immediately previous switching cycle of each of the first and the second synchronization rectification switches SR1 and SR2.

The switch control circuit 10 may determine the on period of a current switching cycle by subtracting a predetermined margin from a conduction period in the immediately previous switching cycle of each of the first and the second synchronization rectification switches SR1 and SR2. The conduction period in the immediately previous switching cycle of each of the first and the second synchronization rectification switches SR1 and SR2 means a period from a point of time at which each of the body diodes BD3 and BD4 connected to the first and the second synchronization rectification switches SR1 and SR2, respectively, becomes conductive to a point of time at which each of the body diodes BD3 and BD4 is blocked. A dead time is present between the on periods of the first and the second synchronization rectification switches SR1 and SR2.

Such a method of controlling the switching of the first and the second synchronization rectification switches SR1 and SR2 is only an example, and the invention is not limited thereto.

The switch control circuit 10 determines whether the resonant converter 1 operates in the below resonance based on the result of a comparison between the period in which the first synchronization rectification switch SR1 is conductive and a period (hereinafter called an "on period") obtained by subtracting a dead time DT from a period (hereinafter called a "maximum on period") in which the first clock signal CLK1 for controlling the conduction of the first switch Q1 is enabled. In some embodiments, the switch control circuit 10 may determine whether the resonant converter 1 operates in the below resonance based on the result of a comparison between the on period of the second switch Q2 and the period in which the second synchronization rectification switch SR2 becomes conductive.

The switch control circuit 10 may perform a control operation for solving problems which may occur when the resonant converter 1 operates in the below resonance. For example, if, as a result of the determination, the operating region of the resonant converter 1 is the below resonance, the switch control circuit 10 may achieve a hold-up time to be a threshold period or more by controlling a current limit level. Furthermore, if, as a result of the determination, the operating region of the resonant converter 1 is the below resonance, the switch control circuit 10 may detect non-zero voltage switching.

Figure 2:
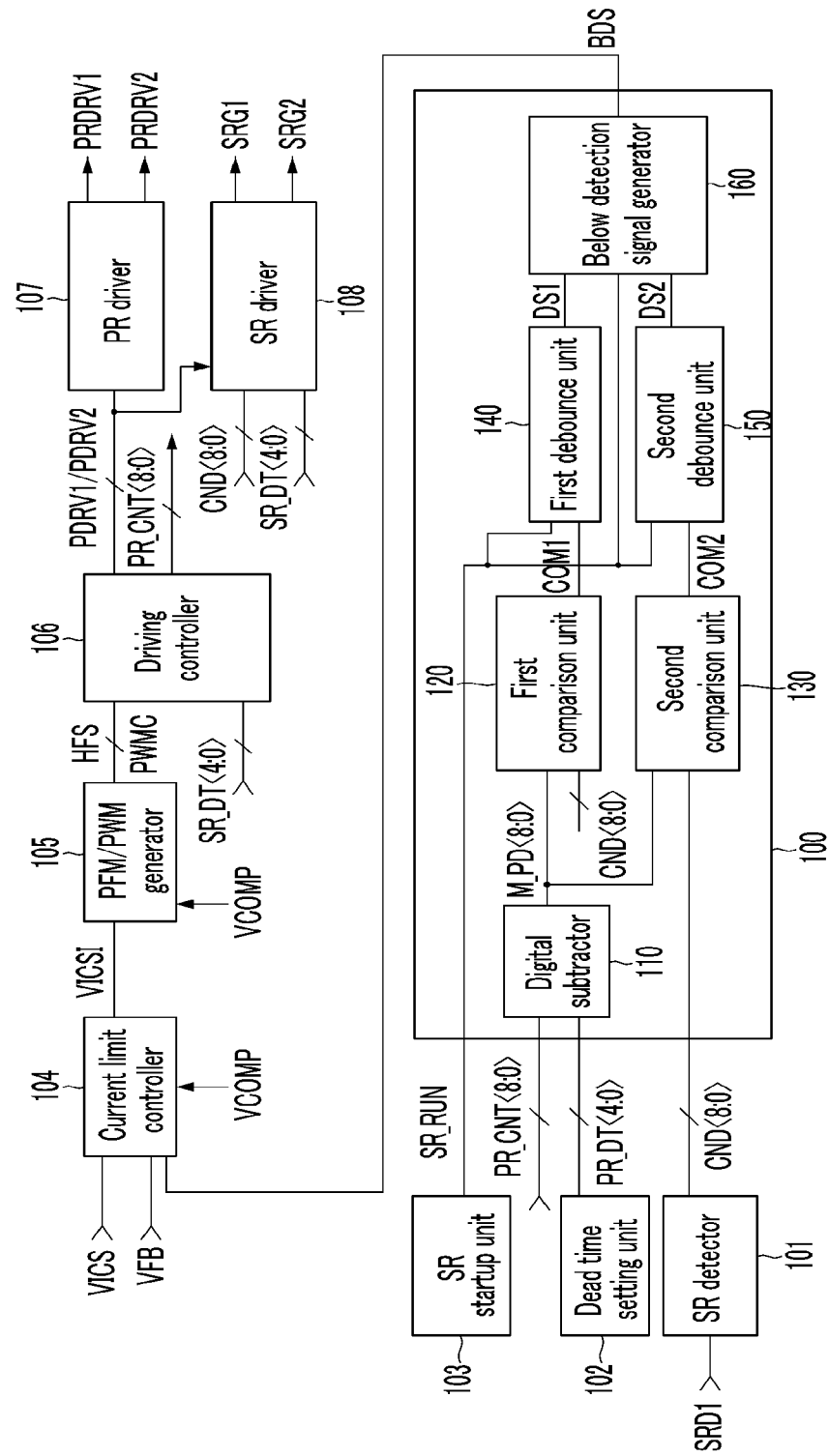
FIG. 2 is a diagram showing the configuration of part of a switch control circuit according to an exemplary embodiment.

FIG. 2 is a diagram showing the configuration of part of a switch control circuit according to an exemplary embodiment.

As shown in FIG. 2, the switch control circuit 10 includes a below resonance detector 100, an SR detector 101, a dead time setting unit 102, an SR startup unit 103, a current limit controller 104, a pulse frequency modulation (PFM)/pulse width modulation (PWM) generator 105, a driving controller 106, a PR driver 107, and an SR driver 108.

The below resonance detector 100 of FIG. 2 determines whether the resonant converter 1 operates in the below resonance based on the result of a comparison between the period in which the first synchronization rectification switch SR1 is conductive and a period in which the first switch Q1 is on.

For example, the below resonance detector 100 receives information (hereinafter called "maximum on-period information" PR_CNT<8:0>) about the period in which the first clock signal CLK1 is enabled from the driving controller 106, information (hereinafter called "dead time information"

PR_DT<4:0>) about the dead time DT1 of the switches Q1 and Q2 on the primary side from the dead time setting unit 102, and information (hereinafter called "conduction period information" CND<8:0>) about the period in which the first synchronization rectification switch SR1 is conductive from the SR detector 101.

In an exemplary embodiment, the maximum on-period information PR_CNT<8:0>, the dead time information PR_DT<4:0>, and the conduction period information CND<8:0> may be respective digital signals of 9 bit, 5 bit, and 9 bit units, but the invention is not limited thereto.

The below resonance detector 100 receives the maximum on-period information PR_CNT<8:0>, the dead time information PR_DT<4:0>, and the conduction period information CND<8:0> and compares on-period information M_PD<8:0>, obtained by subtracting the dead time information PR_DT<4:0> from the maximum on-period information PR_CNT<8:0>, with the conduction period information CND<8:0>. If the state in which the value of the on-period information M_PD<8:0> is greater than that of the conduction period information CND<8:0> is maintained during a first debounce time, the below resonance detector 100 enables a below detection signal BDS. If the state in which the value of the on-period information M_PD<8:0> is smaller than that of the conduction period information CND<8:0> is maintained during a second debounce time, the below resonance detector 100 disables the below detection signal BDS.

The SR detector 101 detects the period in which the first synchronization rectification switch SR1 and the second synchronization rectification switch SR2 are conductive using the first drain voltage SRD1. Since the first drain voltage SRD1 and the drain voltage of the second synchronization rectification switch SR2 has a phase difference of 180 degrees, the periods in which the first synchronization rectification switch SR1 and the second synchronization rectification switch SR2 are conductive may be detected using only one of the two voltages.

The SR detector 101 according to an exemplary embodiment may generate the conduction period information CND<8:0> using the first drain voltage SRD1, for example. However, the invention is not limited to the example. A conduction period information about the period in which the second synchronization rectification switch SR2 is conductive may also be generated and used instead of the conduction period information of the first synchronization rectification switch SR1.

For example, the SR detector 101 may detect the period in which the first synchronization rectification switch SR1 is conductive from a point of time at which the first drain voltage SRD1 falls to a point of time at which the first drain voltage SRD1 rises and generates the conduction period information CND<8:0>. In some embodiments, the SR detector 101 may detect the period in which the second synchronization rectification switch SR2 is conductive from a point of time at which the first drain voltage SRD1 rises to a point of time at which the first drain voltage SRD1 falls and generates the conduction period information CND<8: 0>.

The dead time setting unit 102 sets the dead time information PR_DT<4:0> of the first and the second switches Q1 and Q2 on the primary side and the dead time information SR_DT<4:0> of the first and the second synchronization rectification switches SR1 and SR2. The dead time information PR_DT<4:0> is transmitted to the below resonance detector 100 and the driving controller 106, and the dead time information SR_DT<4:0> is transmitted to the SR driver 108.

If a condition where the first and the second synchronization rectification switches SR1 and SR2 can operate stably is satisfied, the SR startup unit 103 generates an operating signal SR_RUN for the first and the second synchronization rectification switches SR1 and SR2.

The current limit controller 104 receives the below detection signal BDS, the current detection voltage VICS, the feedback voltage VFB, and the control voltage VCOMP and generates an internal detection voltage VICSI. The PFM/PWM generator 105 generates a half-cycle signal HFS for controlling a switching frequency and a signal PWMC (hereinafter called a "PWM control signal") for controlling a PWM operation. In this embodiment, the PFM/PWM generator 105 may use the internal current detection voltage VICSI clamped to a predetermined current limit level instead of the current detection voltage VICS.

The current limit controller 104 may compare the current detection voltage VICS with a current limit level and may clamp the current detection voltage VICS to the current limit level if, as a result of the comparison, the current detection voltage VICS exceeds the current limit level. For example, if the current detection voltage VICS exceeds the current limit level, the current limit controller 104 generates the current limit level as the internal current detection voltage VICSI. If the current detection voltage VICS does not exceed the current limit level, the current limit controller 104 outputs the current detection voltage VICS as the internal current detection voltage VICSI without any change.

The current limit controller 104 determines the current limit level based on the feedback voltage VFB and may increase the current limit level when the below detection signal BDS is enabled (e.g., a high level). Furthermore, the current limit level may have at least two values depending on a load. For example, the current limit controller 104 may set at least a first overload condition (or a mild overload condition) and a second overload condition (or a severe overload condition) depending on a load and set at least two current limit levels VOCL1 and VOCL2 respectively corresponding to the first and the second overload conditions.

Figure 3:
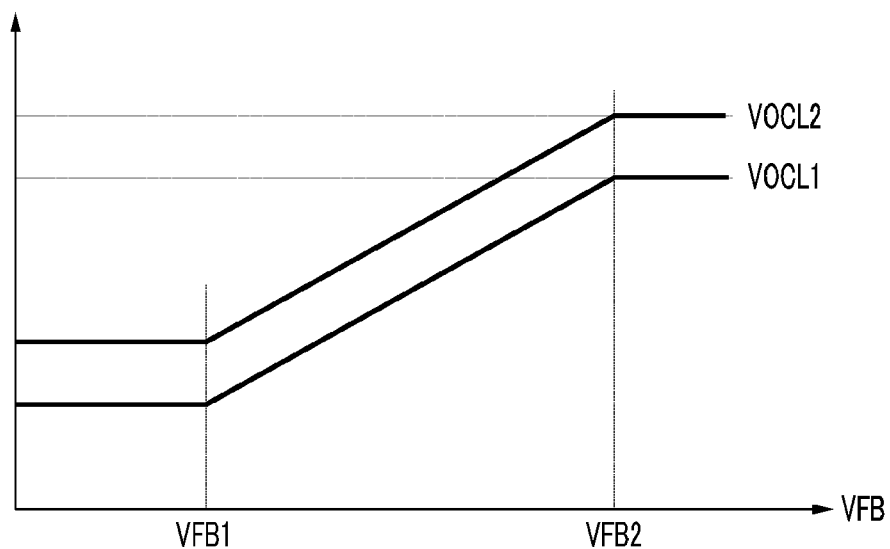
FIG. 3 is a diagram showing a change of current limit levels according to feedback voltages.

FIG. 3 is a diagram showing a change of the current limit levels according to the feedback voltages.

As shown in FIG. 3, when the feedback voltage VFB is smaller than a VFB1 level, the current limit levels VOCL1 and VOCL2 remain constant. When the feedback voltage VFB is the VFB1 level or more to less than a VFB2 level, the current limit levels VOCL1 and VOCL2 are linearly changed in response to the feedback voltage VFB. When the feedback voltage VFB is a VFB2 level or more, the current limit levels VOCL1 and VOCL2 remain constant.

Figure 4:
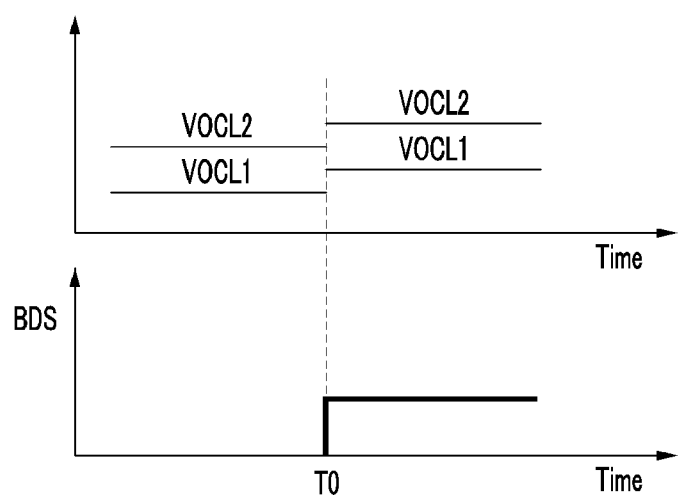
FIG. 4 is a diagram showing a below detection signal and a change of current limit levels.

FIG. 4 is a diagram showing the below detection signal and a change of current limit levels.

As shown in FIG. 4, when the below detection signal BDS becomes a high level at a point of time T0, the current limit levels VOCL1 and VOCL2 rise.

The contents and descriptions of FIGS. 3 and 4 are examples for describing an exemplary embodiment, and the invention is not limited thereto.

The PFM/PWM generator 105 generates the half-cycle signal HFS based on the result of a comparison between the control voltage VCOMP and a signal obtained by adding the internal current detection voltage VICSI and a signal for controlling a switching frequency. The PFM/PWM generator 105 may switch from PFM mode to PWM mode based on the result of a comparison between the control voltage VCOMP and a predetermined PWM threshold voltage and generates the PWM control signal PWMC for PWM control.

For example, in a light load, the control voltage VCOMP is reduced. If the control voltage VCOMP is lower than a predetermined PWM threshold voltage, the PFM/PWM generator 105 switches from PFM mode to PWM mode. The PFM/PWM generator 105 controls a duty cycle in response to the control voltage VCOM in PWM mode (i.e., a constant switching frequency). The PFM/PWM generator 105 sends the control signal PWMC for controlling a duty cycle to the driving controller 106 in PWM mode. Furthermore, the PFM/PWM generator 105 sends the half-cycle signal HFS for generating the first and the second clock signals CLK1 and CLK2 to the driving controller 106.

The driving controller 106 generates the first and the second clock signals CLK1 and CLK2 based on the half-cycle signal HFS and generates first and second driving control signals PDRV1 and PDRV2 based on the first and the second clock signals CLK1 and CLK2 and the dead time information PR_DT<4:0>. In PWM mode, the driving controller 106 may generate the first and the second driving control signals PDRV1 and PDRV2 based on the control signal PWMC and the dead time information PR_DT<4:0>.

For example, the driving controller 106 may decrease the first clock signal CLK1 and increase the second clock signal CLK2 in synchronization with the rising edge of the half-cycle signal HFS and may increase the first clock signal CLK1 and decrease the second clock signal CLK2 at a point of time at which the enable period of the first clock signal CLK1 in an immediately previous switching cycle has elapsed from a point of time of the rising edge of the half-cycle signal HFS. The driving controller 106 may generate the maximum on-period information PR_CNT<8:0> by counting the period in which the first clock signal CLK1 is enabled.

The driving controller 106 generates the first driving control signal PDRV1 based on the first clock signal CLK1 and the dead time information PR_DT<4:0> and generates the second driving control signal PDRV2 based on the second clock signal CLK2 and the dead time information PR_DT<4:0>. For example, the driving controller 106 may increase the first driving control signal PDRV1 to a high level at a point of time delayed from the rising edge of the first clock signal CLK1 by a first dead time according to the dead time information PR_DT<4:0> and may decrease the second driving control signal PDRV2 to a low level at the falling edge of the second clock signal CLK2. The driving controller 106 may increase the second driving control signal PDRV2 to a high level at a point of time delayed from the rising edge of the second clock signal CLK2 by the first dead time and may decrease the first driving control signal PDRV1 to a low level at the falling edge of the first clock signal CLK1.

The PR driver 107 generates the first and the second driving voltages PRDRV1 and PRDRV2 in response to the first and the second driving control signals PDRV1 and PDRV2. The PR driver 107 generates the first and the second driving voltages PRDRV1 and PRDRV2 which have phases synchronized with the first and the second driving control signals PDRV1 and PDRV2 and which have proper levels. The proper level means a level enough to switch the first and the second switches Q1 and Q2.

The first and the second driving control signals PDRV1 and PDRV2, the conduction period information CND<8:0>, and the dead time information SR_DT are transmitted to the SR driver 108.

The SR driver 108 turns on the first and the second synchronization rectification switches SR1 and SR2 in synchronization with the first and the second driving control signals PDRV1 and PDRV2, respectively, determines an on period by subtracting the dead time information SR_DT<4:0> from the conduction period information CND<8:0>, and turns off the first and the second synchronization rectification switches SR1 and SR2 at a point of time at which the on period has elapsed from points of time at which the first and the second synchronization rectification switches SR1 and SR2 are on.

For example, the SR driver 108 generates the first gate voltage SRG1 for turning on the first synchronization rectification switch SR1 in synchronization with at a point of time at which the first driving control signal PDRV1 is enabled. The SR driver 108 may generate the first gate voltage SRG1 for turning off the first synchronization rectification switch SR1 at a point of time at which the on period of the first synchronization rectification switch SR1 has elapsed from a point of time at which the first synchronization rectification switch SR1 is turned on. The SR driver 108 generates the second gate voltage SRG2 for turning on the second synchronization rectification switch SR2 in synchronization with a point of time at which the second driving control signal PDRV2 is enabled. The SR driver 108 generates the second gate voltage SRG2 for turning off the second synchronization rectification switch SR2 at a point of time at which the on period of the second synchronization rectification switch SR2 has elapsed from a point of time at which the second synchronization rectification switch SR2 is turned on. In this case, the on period is determined based on a result of the subtraction of the dead time information SR_DT<4:0> from the conduction period information CND<8:0> in the previous switching cycle of the first synchronization rectification switch SR1.

Referring back to FIG. 2, the below resonance detector 100 includes a digital subtractor 110, a first comparison unit 120, a second comparison unit 130, a first debounce unit 140, a second debounce unit 150, and a below detection signal generator 160.

The digital subtractor 110 generates the on-period information M_PD<8:0> by subtracting the dead time information PR_DT<4:0> from the maximum on-period information PR_CNT<8:0>. The on-period information M_PD<8:0> is transmitted to the first and the second comparison units 120 and 130.

The first comparison unit 120 generates a first comparison signal COM1 based on the result of a comparison between the conduction period information CND<8:0> and first reference information N1<8:0> (refer to FIGS. 6 and 7) based on the on-period information M_PD<8:0>. The first reference information N1<8:0> (refer to FIGS. 6 and 7) is a threshold value for detecting the below resonance and may be a value obtained by multiplying the on-period information M_PD<8:0> by a predetermined first ratio of <1.

The second comparison unit 120 generates a second comparison signal COM2 based on the result of a comparison between the conduction period information CND<8:0> and second reference information N2<8:0> (refer to FIGS. 6 and 7) based on the on-period information M_PD<8:0>. The second reference information N2<8:0> is a threshold value for detecting whether the operating region of the resonant converter has deviated from the below resonance region and may be a value obtained by multiplying the on-period information M_PD<8:0> by a predetermined second ratio of <1. In this case, the second ratio may be greater than the first ratio, and the second reference information N2<8:0> may be greater than the first reference information N1<8:0>.

The first and the second debounce units 140 and 150 are activated in response to the operating signal SR_RUN. For example, the first and the second debounce units 140 and 150 are enabled in response of the operating signal SR_RUN of a high level.

The first debounce unit 140 receives the first comparison signal COM1 and determines whether a first detection period in which the on-period information M_PD<8:0> is smaller than the first reference information N1<8:0> is maintained during a first debounce time based on the first comparison signal COM1. The first debounce unit 140 increases a first detection signal DS1 to a high level at a point of time at which the first detection period is maintained during the first debounce time.

The second debounce unit 150 receives the second comparison signal COM2 and determines whether a second detection period in which the on-period information M_PD<8:0> is greater than the second reference information N2<8:0> is maintained during a second debounce time based on the second comparison signal COM2. The second debounce unit 150 increases a second detection signal DS2 to a high level at a point of time at which the second detection period is maintained during the second debounce time.

The below detection signal generator 160 receives the first detection signal DS1 and the second detection signal DS2, generates the below detection signal BDS of a high level in response to the first detection signal DS1, and generates the below detection signal BDS of a low level in response to the second detection signal DS2. For example, the below detection signal generator 160 may increase the below detection signal BDS to a high level when the first detection signal DS1 of a high level is received and may decrease the below detection signal BDS to a low level when the second detection signal DS2 of a high level is received.

The configuration of the below resonance detector is described below with reference to FIG. 5.

Figure 5:
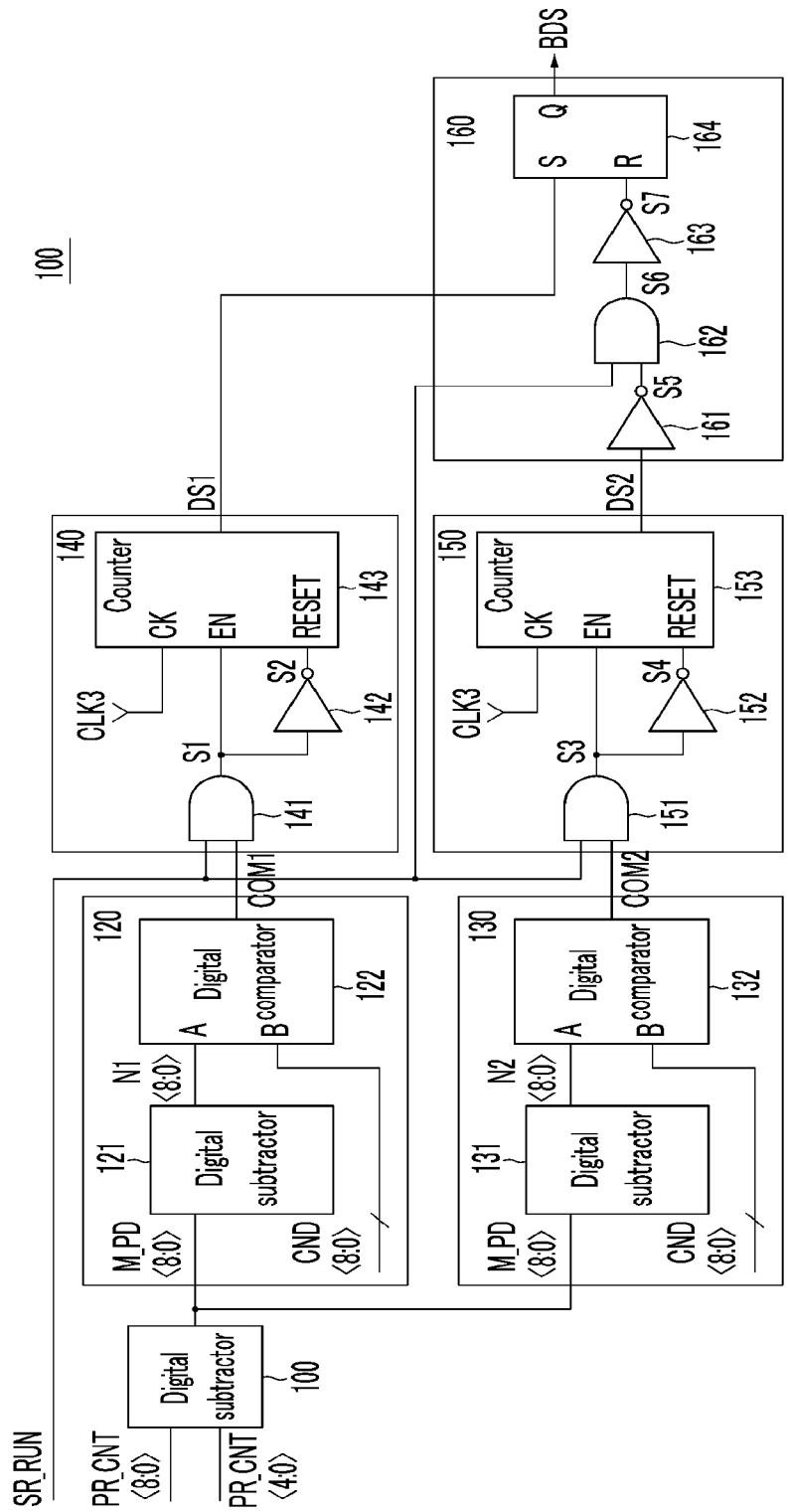
FIG. 5 is a diagram showing the configuration of a below resonance detector.

FIG. 5 is a diagram showing the configuration of the below resonance detector.

The configuration of the below resonance detector 100 shown in FIG. 5 has been given to describe an exemplary embodiment. Accordingly, the invention is not limited to the example.

The first comparison unit 120 includes a digital subtractor 121 and a digital comparator 122. The digital subtractor 121 receives the on-period information M_PD<8:0> and generates the first reference information N1<8:0> by reducing the on-period information M_PD<8:0> at the first ratio. For example, the first comparison unit 120 may generate the first reference information N1<8:0> by subtracting the on-period information M_PD<8:4> of 5 bits from the on-period information M_PD<8:0> of 9 bits.

The digital comparator 122 compares the conduction period information CND<8:0> with the first reference information N1<8:0>, generates the first comparison signal COM1 of a high level if, as a result of the comparison, the conduction period information CND<8:0> is smaller than the first reference information N1<8:0>, and generates the first comparison signal COM1 of a low level if, as a result of the comparison, the conduction period information CND<8:0> is not smaller than the first reference information N1<8:0>.

The second comparison unit 130 includes a digital subtractor 131 and a digital comparator 132. The digital subtractor 131 receives the on-period information M_PD<8:0> and generates the second reference information N2<8:0> by reducing the on-period information M_PD<8:0> at the second ratio. For example, the second comparison unit 130 may generate the second reference information N2<8:0> by subtracting the on-period information M_PD<8:6> of 3 bits from the on-period information M_PD<8:0> of 9 bits.

The digital comparator 132 compares the conduction period information CND<8:0> with the second reference information N2<8:0>, generates the second comparison signal COM2 of a high level if, as a result of the comparison, the conduction period information CND<8:0> is equal or more than the second reference information N2<8:0>, and generates the second comparison signal COM2 of a low level if, as a result of the comparison, the conduction period information CND<8:0> is not greater than the second reference information N2<8:0>.

The first debounce unit 140 includes an AND gate 141, an inverter 142, and a counter 143. The AND gate 141 generates a signal S1 by performing AND operation on the first comparison signal COM1 and the operating signal SR_RUN. The inverter 142 generates a signal S2 by inverting the signal S1. The counter 143 counts the period in which input to an enable terminal EN is a high level using a clock signal CLK3 received through a clock terminal CK and resets a count result when input to a reset terminal RESET is a high level.

When the result of the counting of the period in which input to the enable terminal EN is a high level reaches the first debounce time, the counter 143 outputs the first detection signal DS1 of a high level. When input to the reset terminal RESET becomes a high level before a result of the counting of the counter 143 reaches the first debounce time, the count result is reset. That is, when the signal S1 decreases to a low level and thus the signal S2 increases to a high level, the count result is reset.

The second debounce unit 150 includes an AND gate 151, an inverter 152, and a counter 153. The AND gate 151 generates a signal S3 by performing AND operation on the second comparison signal COM2 and the operating signal SR_RUN. The inverter 152 generates a signal S4 by inverting the signal S3. The counter 153 counts the period in which input to an enable terminal EN is a high level using the clock signal CLK3 received through a clock terminal CK and resets a count result when input to a reset terminal RESET is a high level. That is, when the signal S3 decreases to a low level and thus the signal S4 increases to a high level, the count result is reset.

When the result of the counting of the period in which input to the enable terminal EN is a high level reaches the second debounce time, the counter 153 outputs the second detection signal DS2 of a high level. When input to the reset terminal RESET becomes a high level before a result of the counting of the counter 153 reaches the second debounce time, the count result is reset.

The below detection signal generator 160 includes inverters 161 and 163, an AND gate 162, and an SR latch 164. The inverter 161 generates a signal S5 by inverting the second detection signal DS2. The AND gate 162 generates a signal S6 by performing AND operation of the operating signal SR_RUN and the signal S5. The inverter 163 generates a signal S7 by inverting the signal S6. The SR latch 164 increases the below detection signal BDS to a high level based on the first detection signal DS1 inputted to a set terminal S and resets the below detection signal BDS to a low level based on the signal S7 inputted to a reset terminal R. The below detection signal BDS is output through the output terminal Q of the SR latch 164.

In FIG. 5, the second detection signal DS2 has been illustrated as being inputted to the reset terminal R through the inverter 161, the AND gate 162, and the inverter 163, but the invention is not limited thereto. For example, the second detection signal DS2 may be inputted to the reset terminal R without the inverter 161, the AND gate 162, and the inverter 163.

The operation of the below resonance detector is described below with reference to FIGS. 6 and 7.

Figure 6:
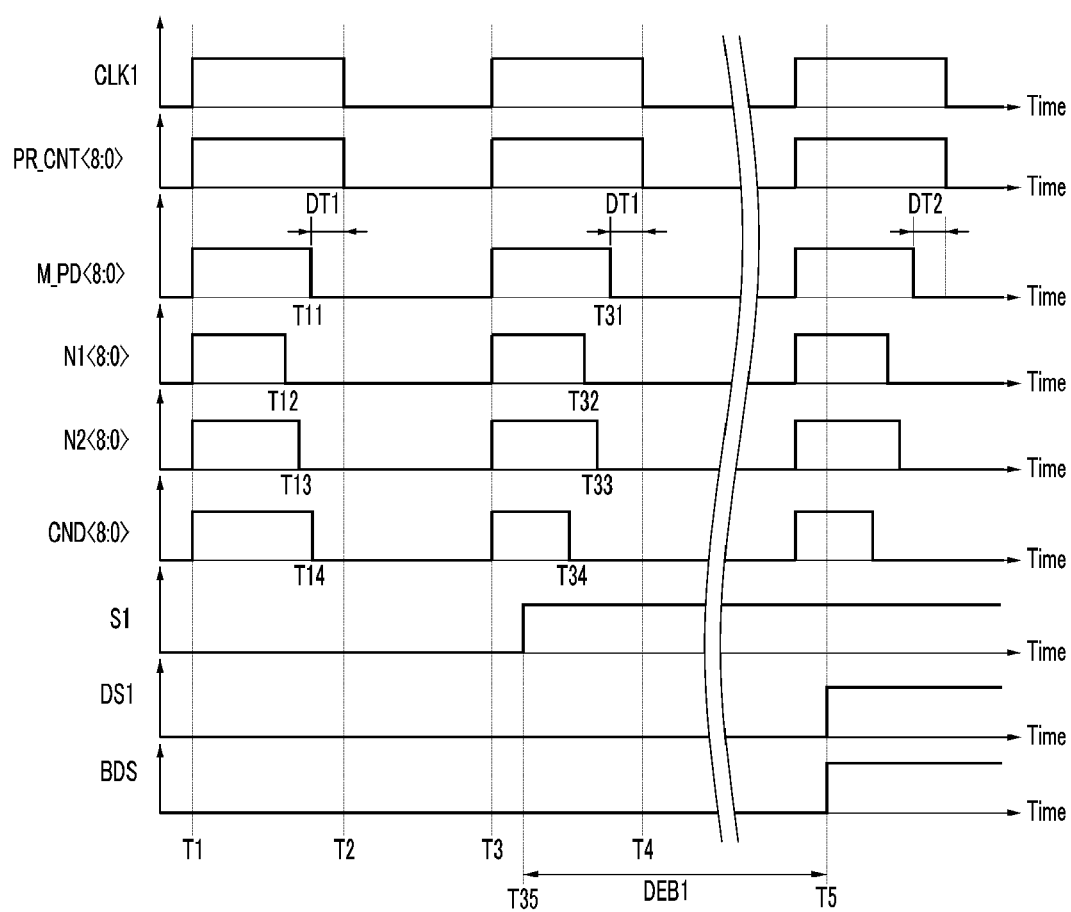
FIG. 6 is a diagram illustrating an example in which the operating region of the resonant converter changes to a below resonance.

FIG. 6 is a diagram illustrating an example in which the operating region of the resonant converter changes to the below resonance.

Figure 7:
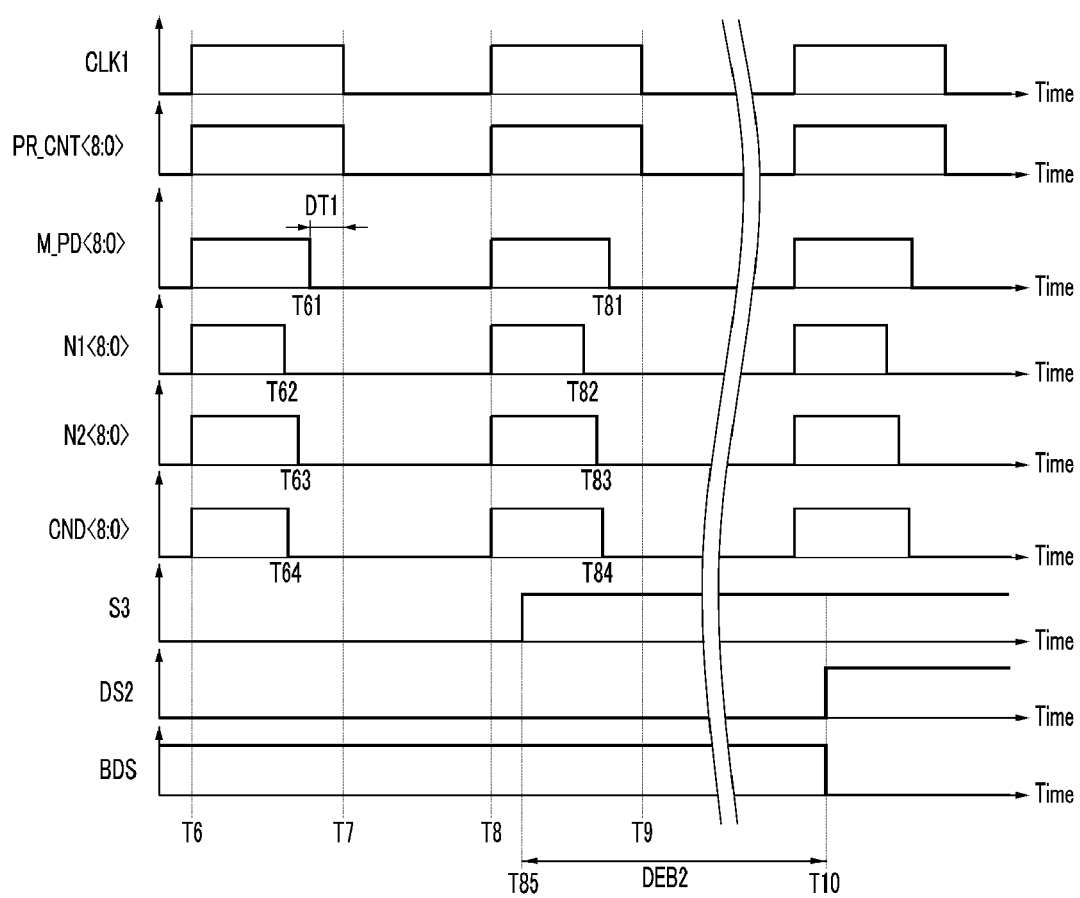
FIG. 7 is a diagram illustrating an example in which the operating region of the resonant converter deviates from the below resonance.

FIGS. 6 and 7 show the waveforms of the first clock signal CLK1, the signal S1, the first detection signal DS1, the second detection signal DS2, and the below detection signal BDS according to a lapse of time. FIGS. 6 and 7 show periods respectively corresponding to the maximum on-period information PR_CNT<8:0>, the dead time information PR_DT<4:0>, the conduction period information CND<8:0>, the on-period information M_PD<8:0>, the first reference information N1<8:0>, and the second reference information N2<8:0> to explain the exemplary embodiment. Actually, the maximum on-period information PR_CNT<8:0>, the dead time information PR_DT<4:0>, the conduction period information CND<8:0>, the on-period information M_PD<8:0>, the first reference information N1<8:0>, and the second reference information N2<8:0> are 9-bit digital signals and are not signals of a high level generated during the periods shown in FIGS. 6 and 7.

In FIG. 6, it is assumed that the operating region of the resonant converter 1 changes to the below resonance.

At a point of time T1, the first clock signal CLK1 rises and the first switch Q1 is turned on after a dead time period. The first clock signal CLK1 falls at a point of time T2 at which the internal current detection voltage VICSI rising after the first switch Q1 is turned on reaches the control voltage VCOMP.

The maximum on-period information PR_CNT<8:0> obtained by counting the period in which the first clock signal CLK1 is a high level prior to the point of time T1 is shows as a period T1-T2 in FIG. 6. Hereinafter, for better understanding and ease of description, the periods in which the first clock signal CLK1 is a high level in neighboring switching cycles are substantially the same in FIGS. 6 and 7.

The on-period information M_PD<8:0> is shows as a period T1-T11 obtained by subtracting a dead time DT1 according to the dead time information PR_DT<4:0> from the period T1-T2 according to the maximum on-period information PR_CNT<8:0> in a immediately previous switching cycle. FIG. 6 shows a period T1-T12 according to the first reference information N1<8:0> based on the on-period information M_PD<8:0> and a period T1-T13 according to the second reference information N2<8:0> based on the on-period information M_PD<8:0>. Furthermore, a period T1-T14 according to the conduction period information CND<8:0> of the first synchronization rectification switch SR1 prior to the point of time T1 is shown in FIG. 6.

Since the conduction period information CND<8:0> is greater than the first reference information N1<8:0> and the second reference information N2<8:0>, the signal S1 is a low level and the first detection signal DS1 is a low level, and thus the below detection signal BDS also maintains a low level.

At a point of time T3, the first clock signal CLK1 rises to a high level, and the first switch Q1 is turned on after the dead time period from the point of time T3. The first clock signal CLK1 falls at a point of time T4 at which the internal current detection voltage VICSI rising after the first switch Q1 is turned on reaches the control voltage VCOMP. The maximum on-period information PR_CNT<8:0> after the point of time T2 is the result of the counting of the period T1-T2 in which the first clock signal CLK1 is a high level in the immediately previous switching cycle T1-T3. As described above, the period T1-T2 and a period T3-T4 are assumed to be the same.

The on-period information M_PD<8:0> is shown as a period T3-T31 obtained by subtracting the dead time DT1 from the period T3-T4 according to the maximum on-period information PR_CNT<8:0>. A period T3-T32 according to the first reference information N1<8:0> based on the on-period information M_PD<8:0> and a period T3-T33 according to the second reference information N2<8:0> based on the on-period information M_PD<8:0> are shown in FIG. 6. Furthermore, a period T3-T34 according to the conduction period information CND<8:0> of the first synchronization rectification switch SR1 is shown in the switching cycle T1-T3.

The signal S1 rises to a high level at a point of time T35 because the conduction period information CND<8:0> is smaller than the first reference information N1<8:0>.

The first detection signal DS1 rises to a high level at a point of time T5 if the conduction period information CND<8:0> is smaller than the first reference information N1<8:0> during a period from the point of time T35 to the point of time T5 after a lapse of the first debounce time DEB1. At the point of time T5, the SR latch 164 is synchronized with the rising edge of the first detection signal DS1 inputted to the set terminal S of the SR latch 164, thus increasing the below detection signal BDS to a high level.

The following should be noted in the description of FIG. 6. A period corresponding to each of the maximum on-period information PR_CNT<8:0>, the first reference information N1<8:0>, the second reference information N2<8:0>, and the conduction period information CND<8:0> is shown in FIG. 6 for the purpose of a comparison and description of the pieces of information. However, a comparison operation between the conduction period information CND<8:0> and the first reference information N1<8:0> and a comparison operation between the conduction period information CND<8:0> and the second reference information N2<8:0> may be performed may be at any point of time after a point of time at which corresponding information is detected.

For example, the maximum on-period information PR_CNT<8:0>, the on-period information M_PD<8:0>, the first reference information N1<8:0>, the second reference information N2<8:0>, and the conduction period information CND<8:0> in the switching cycle T1-T3 may be detected after the point of time T2. That is, a comparison operation between the conduction period information CND<8:0> in the switching cycle T1-T3 and the first reference information N1<8:0> in the switching cycle T1-T3 and a comparison operation between the conduction period information CND<8:0> in the switching cycle T1-T3 and the second reference information N2<8:0> in the switching cycle T1-T3 may be performed at any point of time after the point of time T2. In FIG. 6, the comparison operations between the pieces of information have been illustrated as being terminated at the point of time T35, but the invention is not limited thereto. For example, a point of time at which the comparison operations between the pieces of information are terminated may be a specific point of time after the point of time T2.

The same principle is also applied to a description of FIG. 7.

FIG. 7 is a diagram illustrating an example in which the operating region of the resonant converter deviates from the below resonance.

At a point of time T6, the first clock signal CLK1 rises, and the first switch Q1 is turned on after a dead time period. The first clock signal CLK1 falls at a point of time T7 at which the internal current detection voltage VICSI rising after the first switch Q1 is turned on reaches the control voltage VCOMP.

The maximum on-period information PR_CNT<8:0> obtained by counting the period in which the first clock signal CLK1 is a high level prior to the point of time T6 is shown as a period T6-T7 in FIG. 7.

The on-period information M_PD<8:0> is shown as a period T6-T61 obtained by subtracting a dead time DT1 from the period T6-T7 according to the maximum on-period information PR_CNT<8:0> in a immediately previous switching cycle. FIG. 7 shows a period T6-T62 according to the first reference information N1<8:0> based on the on-period information M_PD<8:0> and a period T6-T63 according to the second reference information N2<8:0> based on the on-period information M_PD<8:0>. Furthermore, a period T6-T64 according to the conduction period information CND<8:0> of the first synchronization rectification switch SR1 prior to the point of time T6 is shown in FIG. 7.

The signal S3 is in a low level and the second detection signal DS2 is also in a low level because the conduction period information CND<8:0> is smaller than the second reference information N2<8:0>. The below detection signal BDS maintains a high level.

At a point of time T8, the first clock signal CLK1 rises to a high level, and the first switch Q1 is turned on after the dead time DT1 from the point of time T8. The first clock signal CLK1 falls at a point of time T9 at which the internal current detection voltage VICSI rising after the first switch Q1 is turned on reaches the control voltage VCOMP.

The maximum on-period information PR_CNT<8:0> after the point of time T7 is the result of the counting of a period T6-T7 in which the first clock signal CLK1 is a high level in a immediately previous switching cycle T6-T8. As described above, the period T6-T7 and a period T8-T9 are assumed to be the same.

The on-period information M_PD<8:0> is shown as a period T8-T81 obtained by subtracting the dead time DT1 from a period T8-T9 according to the maximum on-period information PR_CNT<8:0>. FIG. 7 shows a period T8-T82 according to the first reference information N1<8:0> based on the on-period information M_PD<8:0> and a period T8-T83 according to the second reference information N2<8:0> based on the on-period information M_PD<8:0>. Furthermore, a period T8-T84 according to the conduction period information CND<8:0> of the first synchronization rectification switch SR1 in the switching cycle T6-T8 is shown in FIG. 7.

The signal S3 rises to a high level at a point of time T85 because the conduction period information CND<8:0> is greater than the second reference information N2<8:0>.

If the conduction period information CND<8:0> is greater than the second reference information N1<8:0> during a period from the point of time T85 to a point of time T10 after a lapse of the second debounce time DEB2, at a point of time T10, the second detection signal DS2 rises to a high level, and the SR latch 164 decreases the below detection signal BDS to a low level in synchronization with the rising edge of the second detection signal DS2 inputted to the reset terminal S of the SR latch 164.

When the below resonance is detected as described above in accordance with an exemplary embodiment, the switch control circuit 10 may increase the current limit levels VOCL1 and VOCL2 as described above. This is for constantly regulating the output voltage during the hold-up time. In this case, a more switch current corresponding to a increased current limit level can flow, and thus a current required to regulate the output voltage can be supplied to the secondary side.

Furthermore, when the below resonance is detected, the switch control circuit 10 may determine that a non-zero voltage switching operation has occurred. For example, the switch control circuit 10 may determine non-zero voltage switching based on the below detection signal BDS and a result of the detection of at least one level of the control voltage VCOMP and the detection voltage VCS.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A switch control circuit for a resonant converter, the switch control circuit comprising:
   a first driver circuit configured to drive a first switch on a primary side;
   a second driver circuit configured to drive a first synchronous rectification switch on a secondary side; and
   a below resonance detection circuit configured to determine that an operating region of the resonant converter is below resonance based on a result of a comparison between a conduction period of the first synchronous rectification switch and an on period of the first switch.

2. The switch control circuit of claim 1, wherein the below resonance detection circuit is configured to determine that the operating region of the resonant converter is below resonance when a state in which the conduction period of the first synchronous rectification switch is shorter than the on period of the first switch is maintained during a first debounce time.

3. The switch control circuit of claim 1, wherein the below resonance detection circuit is configured to determine that the operating region of the resonant converter is not below resonance when a state in which the conduction period of the first synchronous rectification switch is longer than the on period of the first switch is maintained during a second debounce time.

4. The switch control circuit of claim 1, wherein the below resonance detection circuit is configured to generate a below detection signal indicative of below resonance operation based on a maximum on-period information corresponding to a period in which a first clock signal for controlling a switching operation of the first switch is enabled, dead time information of the first switch and a second switch on the primary side, and a conduction period information corresponding to the conduction period of the first synchronous rectification switch.

5. The switch control circuit of claim 4, wherein the below resonance detection circuit comprises:

a subtractor configured to generate on-period information about the on period of the first switch by subtracting the dead time information from the maximum on-period information; and a first comparison unit configured to generate a first reference information based on the on-period information and to compare the first reference information with the conduction period information to check whether the first reference information is smaller than the conduction period information, wherein the below resonance detection circuit is configured to enable the below detection signal when an output of the first comparison unit maintains a first level during a first debounce time.

6. The switch control circuit of claim 5, wherein the below resonance detection circuit further comprises:

a second comparison unit configured to generate a second reference information based on the on-period information and compare the conduction period information with the second reference information to check whether the conduction period information is greater than or equal to the second reference information; and the below resonance detection circuit is configured to disable the below detection signal when an output of the second comparison unit maintains the first level during a second debounce time.

7. The switch control circuit of claim 6, wherein:

the first comparison unit is configured to generate the first reference information based on a value obtained by multiplying the on-period information by a first ratio smaller than 1, and the second comparison unit is configured to generate the second reference information based on a value obtained by multiplying the on-period information by a second ratio which is smaller than 1 and which is greater than the first ratio.

8. The switch control circuit of claim 6, wherein the below resonance detection circuit further comprises:

a first debounce unit configured to count a period in which the output of the first comparison unit maintains the first level and to generate a first detection signal when the counted period is maintained during the first debounce time; and a second debounce configured to count a period in which the output of the second comparison unit maintains the first level and to generate a second detection signal when the counted period is maintained during the second debounce time, wherein the below resonance detection circuit is configured to enable the below detection signal in synchronization with the first detection signal and disable the below detection signal in synchronization with the second detection signal.

9. The switch control circuit of claim 8, wherein the below resonance detection circuit further comprises:

an SR latch comprising a set terminal to which the first detection signal is inputted and a reset terminal to which a signal corresponding to the second detection signal is inputted, wherein the SR latch is configured to enable the below detection signal in response to input to the set terminal and disable the below detection signal in response to input to the reset terminal.

10. The switch control circuit of claim 1, wherein the switch control circuit is configured to increase a current limit level to maintain an output voltage of the resonant converter at least during a predetermined hold-up time when the resonant converter operates below resonance.

11. The switch control circuit of claim 10, wherein the switch control circuit is configured to control the current limit level based on a feedback voltage corresponding to the output voltage.

12. The switch control circuit of claim 10, wherein the switch control circuit is configured to clamp a current detection voltage corresponding to a load current to the current limit level when the current detection voltage is greater than or equal to the current limit level, and control switching operations of the first and a second switch on the primary side based on a result of a comparison between the clamped current limit level and a control voltage corresponding to the output voltage.

13. The switch control circuit of claim 1, wherein the switch control circuit is configured to detect non-zero voltage switching when the resonant converter operates below resonance.

14. A switch control circuit for resonant converter, the switch control circuit comprising:

a first driver configured to output a first drive signal through a first node to drive a first switch on a primary side and output a second drive signal through a second node to drive a second switch on the primary side;

a second driver configured to output a third drive signal through a third node to a first synchronous rectification switch on a secondary side and output a fourth drive signal through a fourth node to a second synchronous rectification switch on the secondary side, wherein the switch control circuit is configured to determine that an operating region of the resonant converter is below resonance based on a result of a comparison between a conduction period of the first synchronous rectification switch and an on period of the first switch.

15. The switch control circuit of claim 14, wherein the switch control circuit is configured to calculate the on period of the first switch, detect the conduction period of the first synchronization rectification switch, count a period in which the conduction period of the first synchronous rectification switch is shorter than the on period of the first switch, and determine that the operating region of the resonant converter is below resonance when a result of the count reaches a first debounce time.

16. The switch control circuit of claim 15, wherein the switch control circuit is configured to calculate the on period of the first switch by generating a first clock signal based on a current detection voltage corresponding to a load current and a control voltage corresponding to an output voltage of the resonant converter, counting a period in which the first clock signal is enabled, and subtracting a dead time of the first and the second switches from the counted enable period.

17. The switch control circuit of claim 15, wherein the switch control circuit is configured to count the period in which the conduction period of the first synchronous rectification switch is shorter than the on period of the first switch by comparing a period corresponding to a first ratio of the on period of the first switch with the conduction period of the first synchronous rectification switch.

18. The switch control circuit of claim 14, wherein the switch control circuit is configured to increase a current limit level to maintain an output voltage of the resonant converter during at least a predetermined hold-up time when the resonant converter operates in the below resonance.

19. The switch control circuit of claim 18, wherein the switch control circuit is configured to control the current limit level based on a feedback voltage received on a fifth node of the switch control circuit, the feedback voltage corresponding to an output voltage of the resonant converter.

20. The switch control circuit of claim 15, wherein the switch control circuit is configured to detect non-zero voltage switching when the resonant converter operates below resonance.

* * * * *